United States Patent [19]

Sharrah et al.

[11] Patent Number: 5,432,689
[45] Date of Patent: Jul. 11, 1995

[54] FLASHLIGHT AND RECHARGING SYSTEM THEREFOR

[75] Inventors: Raymond L. Sharrah, Collegeville; Charles W. Craft, Lansdale, both of Pa.

[73] Assignee: Streamlight, Inc., Norristown, Pa.

[21] Appl. No.: 3,704

[22] Filed: Jan. 13, 1993

[51] Int. Cl.⁶ ............................................. F21L 7/00
[52] U.S. Cl. ................................... 362/183; 362/205; 362/191; 439/929
[58] Field of Search ............... 362/183, 190, 191, 205, 362/208; 439/929, 374, 680; 320/2, 3

[56] References Cited

U.S. PATENT DOCUMENTS

| | | | |
|---|---|---|---|
| 2,236,338 | 3/1941 | Emanuel | 362/183 |
| 2,293,284 | 8/1942 | Emanuel | 362/183 |
| 2,518,039 | 8/1950 | Malki et al. | 362/183 |
| 3,217,156 | 11/1965 | Sherwood | 362/163 |
| 3,261,973 | 7/1966 | Kott | 362/183 |
| 3,264,545 | 8/1966 | Kott | 320/22 |
| 3,517,185 | 6/1970 | Moore et al. | 362/183 |
| 3,521,050 | 7/1970 | Shagena, Jr. | 362/183 |
| 3,659,180 | 4/1972 | Urbush | 320/2 |
| 3,787,678 | 1/1974 | Rainer | 362/183 |
| 3,825,740 | 7/1974 | Friedman et al. | 362/183 |
| 3,829,676 | 8/1974 | Nelson et al. | . |
| 4,092,580 | 5/1978 | Prinsze | . |
| 4,114,187 | 9/1978 | Uke | . |
| 4,171,534 | 10/1979 | Strowe | . |
| 4,225,814 | 9/1980 | Gantz et al. | 320/2 |
| 4,286,311 | 8/1981 | Maglica | . |
| 4,325,107 | 4/1982 | MacLeod | . |
| 4,382,219 | 5/1983 | Heine et al. | 362/183 |
| 4,388,673 | 6/1983 | Maglica | 362/183 |
| 4,438,483 | 3/1984 | Gulliksen et al. | . |
| 4,502,102 | 2/1985 | Phipps | . |
| 4,531,178 | 7/1985 | Uke | 362/183 |
| 4,819,139 | 4/1989 | Thomas | 362/183 |
| 4,843,526 | 6/1989 | Price, III | . |
| 4,881,158 | 11/1989 | Price, III | . |
| 5,008,785 | 4/1991 | Maglica et al. | . |
| 5,109,321 | 4/1992 | Maglica et al. | . |
| 5,113,326 | 5/1992 | Maglica | . |
| 5,121,308 | 6/1992 | Maglica et al. | . |
| 5,128,841 | 7/1992 | Maglica et al. | . |

*Primary Examiner*—Ira S. Lazarus
*Assistant Examiner*—L. Heyman
*Attorney, Agent, or Firm*—Dann, Dorfman, Herrell and Skillman

[57] ABSTRACT

A guide plate on the head of the flashlight provides an alignment feature which aligns a pair of flashlight charging contacts with a pair of terminals in charging unit for releasably holding the flashlight in its charging receptacle. The flashlight is held within the charging receptacle in a consistent orientation, so that the flashlight switch may be easily found when the flashlight is grasped. The charging receptacle grips the head portion of the flashlight with a pair of spring-loaded jaws. A battery assembly is provided which presents both positive and negative terminals at the forward end of the battery unit. Connections are made from the forward end of the battery to an interconnection module within the flashlight head assembly.

9 Claims, 6 Drawing Sheets

FLASHLIGHT AND RECHARGING SYSTEM THEREFOR

FIELD OF THE INVENTION

The present invention relates to a rechargeable flashlight and recharging unit. More specifically, the invention relates to a compact recharging unit having an alignment feature and a rechargeable flashlight which employs a custom battery assembly and a recharging fixture.

BACKGROUND

Metal flashlights, such as machined aluminum flashlights, are commonly finished, such as by surface anodization or bright dipping, to protect the surface of the flashlight and to impart an aesthetic quality to the flashlight. The body of such flashlights commonly includes a threaded tail cap for providing access to the battery compartment and which also serves as a battery terminal contact. Since the body of such flashlights usually provides part of the electrical circuit between the batteries and the light bulb, it is necessary for such electrically and physically mating surfaces as the body and the tail cap to be machined subsequent to surface finishing, such as anodizing, so that the electrical path through the body will have a low resistance. Machining the mating surfaces of the flashlight after surface finishing increases the cost of fabricating the flashlight due to the expense of a further machining step after anodizing and occasional damage to the finished surface of the flashlight during such further machining. To avoid further machining, it would be desirable to provide a battery assembly which presents both positive and negative contacts at the forward end of the flashlight so that the body of the flashlight would not need to be used as part of the electrical circuit. Hence, all machining of parts could be achieved before anodization.

It is known in the art to provide flashlights with rechargeable batteries. In prior art arrangements, when the flashlight is in the charger unit, the switch may be covered and inaccessible or the flashlight may be oriented (i.e. about the roll axis) in a wide variety of orientations. Hence the switch for operating the flashlight may be in a wide variety of orientations with respect to the charger unit. However, flashlights are often needed when it is dark in the vicinity of the flashlight in the charger unit. Hence, it would be desirable to provide a recharging system for a rechargeable flashlight which consistently presents the flashlight to the user with a known orientation of the operating switch on the flashlight in order to minimize fumbling for the switch on the flashlight in a dark environment.

It is recognized that a flashlight that is tightly held within a recharging unit in order to withstand vibration may be difficult to remove from the charging unit. This latter problem is increased if the flashlight is of compact size. Hence, it would be desirable to provide a rechargeable flashlight which is tightly held within a recharging unit while being easily removable to remove from the charging unit when needed.

SUMMARY OF THE INVENTION

According to one aspect of the invention an elongated, tubular battery assembly has both positive and negative terminals located at the same end of the assembly. The battery assembly is composed of stacked cells of the sub-C NiCd rechargeable type. The stack of cells is preferably surrounded or wrapped in a first layer of shrink wrap tubing, which leaves exposed the positive contact of the top cell and the negative contact of the bottom cell. A conductive terminal extension member is preferably attached to the negative contact of the stack. An elongated conductor electrically connects the conductive extension member to an annular collar which forms the negative contact of the battery assembly and holds the elongated conductor in place. preferably, a further layer of shrink wrap tubing holds the elongated conductor in place and covers the conductor along the side of the assembly.

According to another aspect of the invention, an interconnection module located in the head of the flashlight provides interconnection of the battery assembly, the lamp, and a pair of charging contacts. The interconnection module is a three-dimensional "circuit board" formed of a single piece of selectively-plated plastic. Contact is made between the interconnection module and the battery assembly by suitable conductors. The interconnection module mates with a switch module inside the head of the flashlight.

According to another aspect of the invention, the rechargeable flashlight is provided a guide means in the form of a guide plate which mates with alignment surfaces of the charging unit. The mating action of the guide plate and the alignment surfaces provides mating of the charging contacts on the head of the flashlight with the charging terminals of the charging unit. The charging contacts on the flashlight have concave surfaces which mate with convex surfaces of the charging terminals to assure the charging conditions.

BRIEF DESCRIPTION OF THE FIGURES

The foregoing summary, as well as the following detailed description of preferred embodiments of the present invention, will be better understood when read in conjunction with the accompanying drawings, in which.

DETAILED DESCRIPTION OF THE INVENTION

Figure 1:
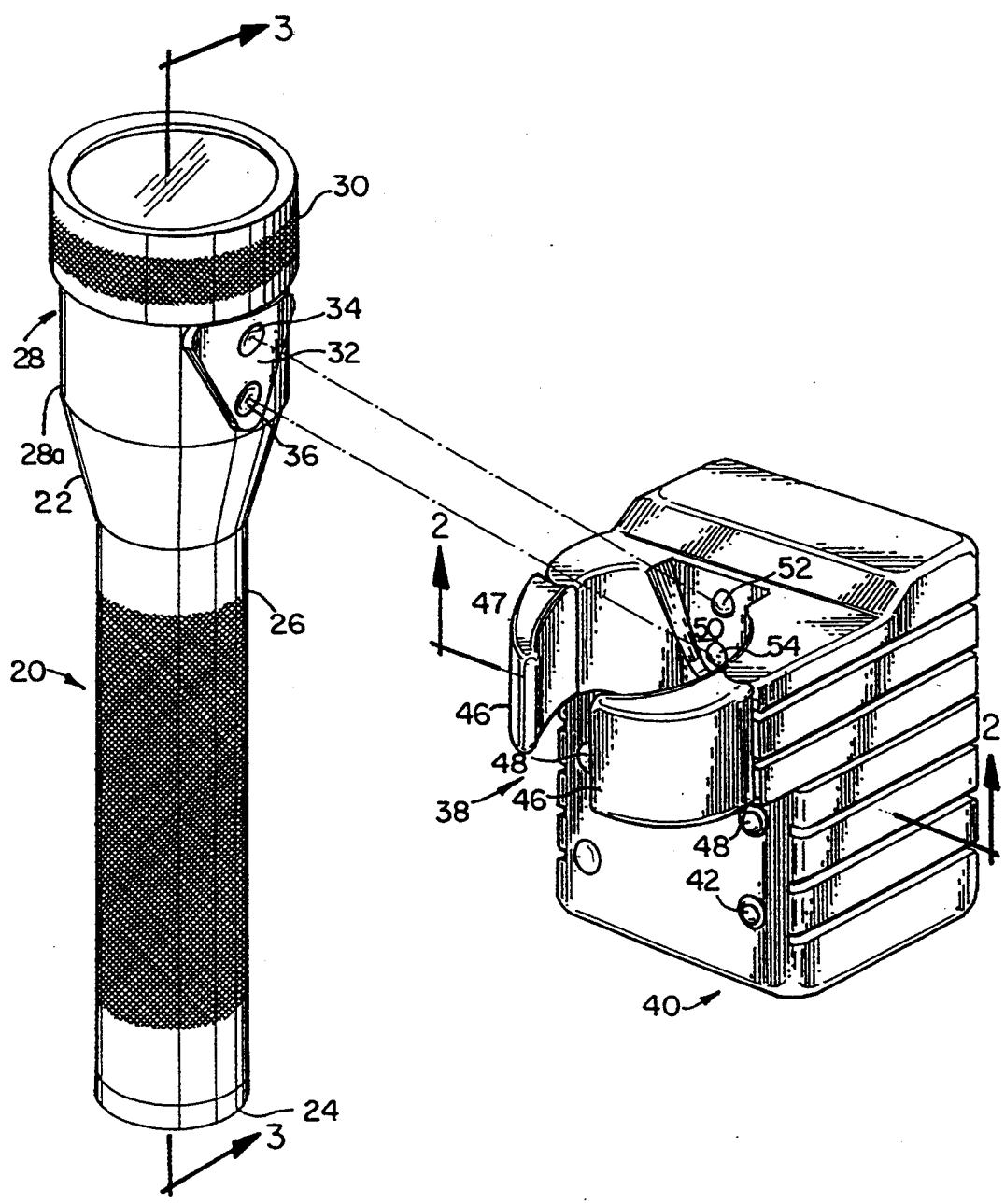
FIG. 1 is an elevational view of the flashlight and a perspective view of its charging unit in accordance with the present invention.

Referring to FIG. 1, there is shown a flashlight 20 and a charging unit 40. The flashlight 20 includes a head assembly 28, a barrel 26, and a tail cap 24. A guide means, such as triangular guide plate 32, is mounted on the side of the head 28. A pair of charging contacts such as concave contacts 34 and 36 are located in the guide plate 32. The guide plate mates with an alignment recess 50 of the charging unit 40, when the flashlight 20 is placed into the charging unit 40.

The charging unit 40 includes a pair of jaws 46, a receptacle generally designated 38 which includes the alignment recess 50, and a pair of convex charging terminals 52 and 54 in the alignment recess 50. The recess 50 is shaped to receive and align the guide plate 32, so that the charging terminals 52 and 54 of the charging unit 40 mate with respective charging contacts 34 and 36, when the flashlight is received or mounted in the charging unit 40. The jaws 46 snugly grip the head 28 of the flashlight 20 with a gripping action described in greater detail hereinafter. The gripping action of the jaws 46 is adapted to securely hold the flashlight 20 and to allow the charging unit 40 be mounted in any desired orientation without the flashlight separating from the charging unit. The gripping action of the jaws 46 further allows the charging unit 40 to be mounted upon surfaces subject to vibration such as occurs within an automobile or other vehicle, and urges the contacts 34 and 36 securely against charging terminals 52 and 54.

The charging unit 40 further includes an LED 42 for indicating when the flashlight 20 is being charged, a power plug (not shown) for connecting the charging unit to a source of electrical energy such as an automotive electrical system, and a pair of screw holes 48 which extend through the charging unit 40. The screw holes 48 receive elongated screws which facilitate the charging unit being conveniently mounted upon a surface, such as a kick plate of an automobile passenger compartment. A charging circuit (not shown) is contained within the charging unit 40. The charging circuit may provide a trickle current to maintain the charge of the batteries, or it may include other features of battery charging circuits which are well-known to those skilled in the art.

Although the guide plate 32 and the recess 50 are shown in FIG. 1 with mating V-shaped surfaces, it should be appreciated that various other interlocking geometries may be employed within the scope of the invention to guide and align the flashlight in the charging unit for mating the charging contacts 34 and 36 of the flashlight with terminals 52 and 54 of the charging unit 40. As an alternative, a projecting member upon the charging unit may be formed to mate with a recessed surface of the flashlight in order to provide the functionality of the guide plate 32 and alignment recess 50. It is likewise noted that the concave and convex mating surfaces of the respective charging contacts and terminals may be of other configurations than that shown in FIG. 1.

It should be apparent that the flashlight is preferably inserted in charging unit 40 by pressing the barrel 26 between the jaws 46 and moving the head of the flashlight axially to mate the head within the jaws and the guide plate 32 into the alignment recess 50. The flashlight 20 may be removed from the charging unit 40 by gripping the barrel 26 and applying a levering action to the barrel 26 using the head 28 as the fulcrum. Since the flashlight 20 is preferably of compact size, such as from 5 inches to 8 inches in length, the location of the guide plate 32 upon the head of the flashlight 20 provides greater leverage for removing the flashlight from the charging unit 40 than would otherwise be available if the charging contacts 34 and 36 and the guide plate 32 were located at a lower position on the flashlight, such as on the taper 22 or the barrel 26. Alternatively, the flashlight 20 may be removed from the charging unit 40 by sliding the flashlight upward within the receptacle 38 and then moving the barrel 26 out of the receptacle thus reversing the action of inserting the flashlight into the charging unit 40.

Figure 2:
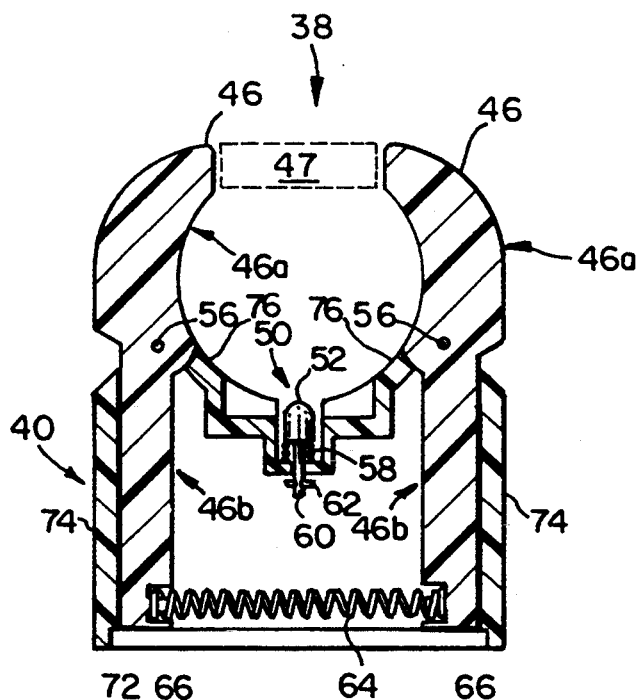
FIG. 2 is a sectional view of the charging unit of FIG. 1 taken along the line 2—2 of FIG. 1.

The gripping mechanism of the jaws 46 of the charging unit 40 is best seen in FIG. 2. Each of the jaws 46 includes a protruding curved portion 46a and an integral elongated portion 46b which extends into the interior of the charging unit 40. The jaws 46 are mounted about pivots 56 at the junction between the curved portions 46a and the elongated portions 46b. The elongated portion 46b of each jaw 46 is provided with a retaining groove 66 for holding one end of a compression spring 64 which extends between the two elongated portions 46b. The compression spring 64 biases the jaws 46 against the exterior walls 74 of the charger unit 40. The gap 47 between the jaws 46 is of sufficient size to accommodate the barrel 26 as the flashlight 20 is placed into the charger. As the flashlight 20 is placed into the charging unit 40, guide plate 32 is lowered into the alignment recess 50 and the curved portions 46a of the jaws 46 are pushed apart by the taper portion 22 of the flashlight. When the guide plate 32 has been completely lowered into the alignment recess 50, the jaws 46 snugly grip only the head portion 28a of the flashlight. In alternative embodiments, the jaws 46 may be maintained in the position shown by inward pressure of the curved portions 46a against lips 76 rather than by outward pressure of the elongated portions 46b against exterior walls 74. The use of a single compression spring between the two jaws 46 provides a balanced gripping action of the jaws so that the flashlight is not biased to one side as it is removed from the charging unit 40. In alternative embodiments, a single pivoting jaw may be used or each of the jaws may be provided with a separate spring.

The configuration of the charging terminals 52 and 54 is exemplified by the view of the charging terminal 52 seen in FIG. 2. The charging terminal 52 has a rounded end attached to a shaft 60. The shaft 60 extends through the anterior wall of the guide recess 50 and is secured by a retaining ring 62. A compression spring 58 positioned behind the rounded head of the charging terminal 52 urges the rounded end to extend into the guide recess 50. Such spring-loaded mounting of the charging terminals 52 and 54 allows the charging terminals to retract into the charging unit 40 as the guide plate 32 is lowered into the charging position. As the charging terminals 52 and 54 are aligned with the charging contacts 34 and 36 of the flashlight 20, the charging terminals 52 and 54 are biased into mating arrangement with the charging contacts 34 and 36.

Figure 3:
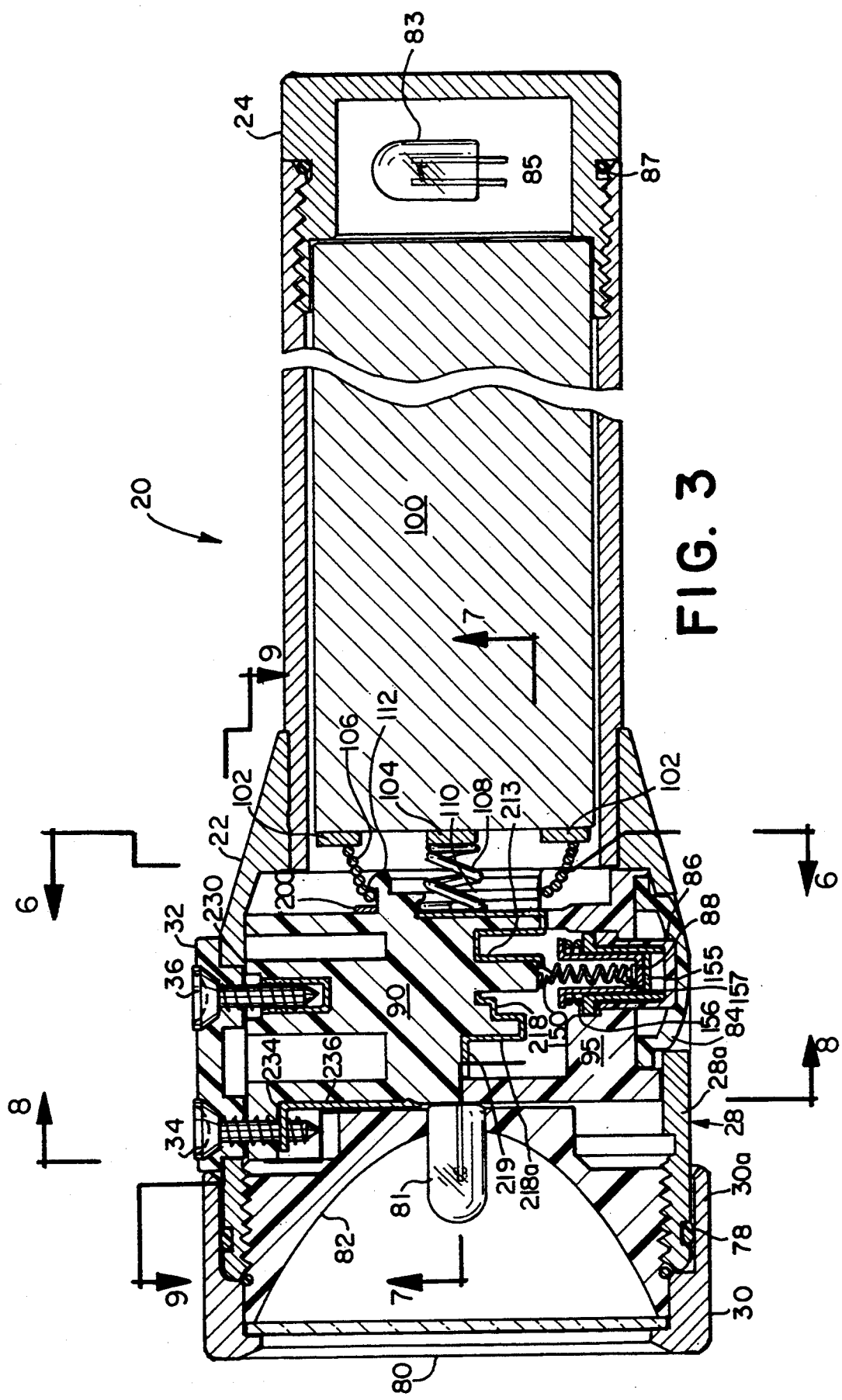
FIG. 3 is a sectional view of the flashlight of FIG. 1 taken along line 3—3 of FIG. 1.

Turning now to FIG. 3, it is shown that the charging contacts 34 and 36 are preferably formed of screws which are threaded or pressed into the head 28 and secure the guide plate 32 thereto. Before being threaded or pressed into the head 28, the slotted surfaces of the screws may be machined, if necessary, to form the concave depressions of the charging contacts 34 and 32.

The head assembly 28 of the flashlight 20 includes a lens cap 30 with a knurled outer surface for ease of turning the lens cap 30. The head assembly 28 houses a socket assembly made of a switch module 95, which is interlocked with an interconnection module 90. The interconnection module 90 provides one form of connecting means for electrical interconnection between the battery assembly 100, the switch module 95, the charging contacts 34 and 36, and a lamp 82. The lamp 82, preferably a bi-pin halogen lamp, is plugged into the socket assembly and extends through an opening in a parabolic reflector 82. The parabolic reflector 82 is press-fitted into the lens cap 30. The portion of the parabolic reflector 82 which mates with the interior surface of the head 28 is threaded so that as the lens cap 30 is turned, the parabolic reflector 82 is axially translated relative to the lamp 81, thus projecting a beam having a variable angle of divergence. The parabolic reflector 82 and the lamp 81 are protected by a lens 80, which is preferably made an acrylate polymer such as LEXAN. The lens 80 may be transparent or selectively transparent to some portion of the light produced by the lamp 81, such as by tinting or polarization. The lens cap or ring 30, includes a sleeve 30a which surrounds the forward end of the head portion 28a. An o-ring 78 is mounted within a groove in the head portion 28a between the sleeve 30a and the head portion 28a. The o-ring 78 provides a water-tight seal between the head portion 28a and the sleeve of the lens cap 30. The o-ring 78 also stiffens the joint between the head and the lens cap sleeve 30a to prevent vibration and to frictionally maintain the focus of the beam. The lens cap and the parabolic reflector may be completely unscrewed from the forward end of the flashlight to provide access to the lamp 81.

The switch module 95 is preferably molded of a polymer material, such as an ABS plastic. The switch module 95 includes a "press-on/press-off" switch mechanism of a well-known type having a plunger cap 86 and ratchet 155, which applies downward pressure upon a spring 156 and, in turn, a plunger contact 88 when the switch is actuated. The plunger 88 rides upon another spring 157 which rests against a plated conductive plunger shaft 150. When pressed down onto the shaft 150, the plunger 88 locks into an "on" or "off" position according to the original state of the switch. The bottom portion of the plunger 88 provides a conductive surface which completes an electrical connection between two segments or traces that may be plated into the switch well 214 as described in greater detail hereinafter. The switch module 95 is protected from moisture by a flanged rubber seal 84 which is secured over the cap 86 between the switch module 95 and the interior surface of the head 28. The flanged rubber seal 84 is located on the opposite side of the flashlight 20 with respect to the charging contacts 34 and 36 for ease of finding the switch when the flashlight is removed from the charging unit 40.

Figure 4:
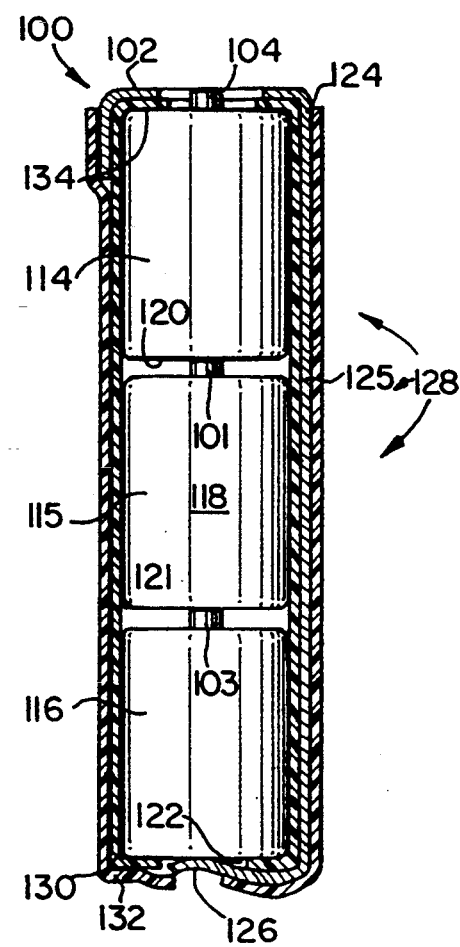
FIG. 4 is another sectional view of a battery assembly of FIG. 3 with the electrical connections for the assembly enlarged for clarity.

The barrel 26 of the flashlight 20 is hollow and contains a tubular battery assembly or unit 100. The battery assembly 100 includes a center battery terminal 104 at the forward or head end of the assembly. The center battery terminal 104 is surrounded by an annular battery terminal 102 as shown in FIG. 4. The center battery terminal 104 is preferably the positive terminal and the annular battery terminal 102 is preferably the negative terminal. Electrical connection between terminal 104 and the interconnection module 90 is established by contact spring 108, which is retained by the interconnection module 90 within a contact spring recess 110. Electrical connection between terminal 102 and the interconnection module 90 is established by contact spring 106 which is retained by the interconnection module 90 upon a contact spring retainer 112.

The tailcap 24 is threaded onto the distal or rear end of the barrel 26, so that the tailcap 24 may be unscrewed for removal of the battery assembly or for retrieval of a spare lamp 83 stored within a hollow compartment 85 in the tailcap 24. The threaded connection between the rear end of the barrel 26 and the tailcap 24 need not be machined after the metal surfaces of the flashlight have been finished as has commonly been the practice heretofore. Since both terminals of the battery assembly 100 are made at the forward or head end of the battery assembly 100, the threaded connection between the barrel 26 and the tailcap 24 is not employed to complete any electrical circuit between the battery assembly 100 and the lamp 81. It is noted, however, that such use of a tailcap as part of the electrical circuit may be practiced in alternate embodiments employing other aspects of the invention.

The battery assembly 100 is shown in greater detail in FIG. 4. The battery assembly includes a stack of cells generally designated 118 forming a battery of electrochemical voltaic cells 114, 115, and 116. The cells 114, 115, and 116 are preferably secondary, or rechargeable cells of the Nickel-Cadmium type, although other electrochemical materials, such as Nickel-Metal Hydride, Lithium, or other types of cells may be employed. The cells are most preferably three sub-C size NiCd cells. Sub-C NiCd cells are widely available, sufficiently compact, and exhibit a superior energy density. The stack typically operates at a capacity of 1 Ah to 2 Ah at 3 V to 4 V. The cells 114, 115, and 116 have respective top contacts 104, 101, and 103, and respective bottom contacts 120, 121, and 122. The cells are stacked in series so that the top contact 104 of the top cell 114 provides the contact to one pole of the stack 118, while the bottom contact 122 of the bottom cell 115 provides contact to the other pole of the stack 118. The top contact 104 is oriented toward the forward or head end of the flashlight 20 when the battery assembly 100 is inserted in use into the barrel with the tail cap removed.

The stack 118 is surrounded by a sheath 130 which insulates the stack 118 and provides mechanical support or holds the cells together. The sheath 130 is preferably formed of shrink-wrap tubing. The sheath 130 tightly surrounds the stack 118, leaving at least portions of the top cell contact 104 and the bottom cell contact 122 exposed.

Figure 5:
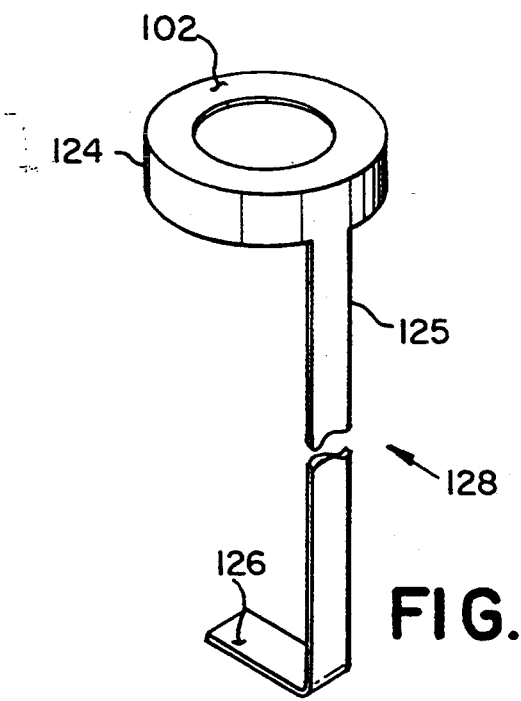
FIG. 5 is a perspective view of the conductive connection member of the battery assembly of FIG. 4.

In order to provide both terminals of the battery assembly 100 at the forward or head end of barrel 26, a terminal extension member or piece 128 provides a conduction path from the bottom cell contact 122 to the annular battery terminal 102. The terminal extension piece includes a conductive tab 126 which is attached to the bottom cell contact 122, an elongated conductor 125 attached to the conductive tab 126, and a terminal end 124 adjacent to and surrounding but spaced and insulated from the top contact 104 of the battery assembly 100. The top surface of the terminal end 124 serves as the forward or negative terminal 102 of the battery assembly 100. As may be seen in FIG. 5, the terminal end 124 of the terminal extension piece 128 is preferably is in the form of an annular collar. The elongated conductor 125 may be of a single piece with the terminal end 124 or may alternatively be formed of a separate strap which is suitably attached, such as by spot welding, to the terminal end. In other embodiments, a plurality of elongated conductors may be employed. The conductive tab 126 may be formed by bending the lower end of the elongated conductor 125.

Returning to FIG. 4, the annular collar of the terminal end 124 is fitted over the annular shoulder 134 at the top of the stack 118. The conductive tab 126 is attached to the portion of the bottom contact 122, which was left exposed by sheath 130. The conductive tab 126 is attached to the bottom contact 122 by a suitable attachment procedure which maintains electrical continuity such as spot welding or soldering.

After the terminal extension piece 128 is fitted to the stack, the battery assembly 100 is wrapped in a second sheath 132 surrounding both the stack and the terminal extension piece 125. The second sheath 132 is preferably formed of shrink-wrap tubing, which is of sufficient length to leave the terminal 102 of the terminal extension piece 128 exposed. The second sheath provides further insulation and mechanical support to the battery assembly and also serves to protect the terminal extension piece 128 from damage due to impact against the interior surface of the barrel 26 or during shipment. The second sheath is preferably of sufficient thickness to provide a snug fit of the battery assembly 100 within the barrel 26 so that the battery assembly 100 does not vibrate within the barrel 26 and detract from the solid "feel" of the flashlight.

Figure 6:
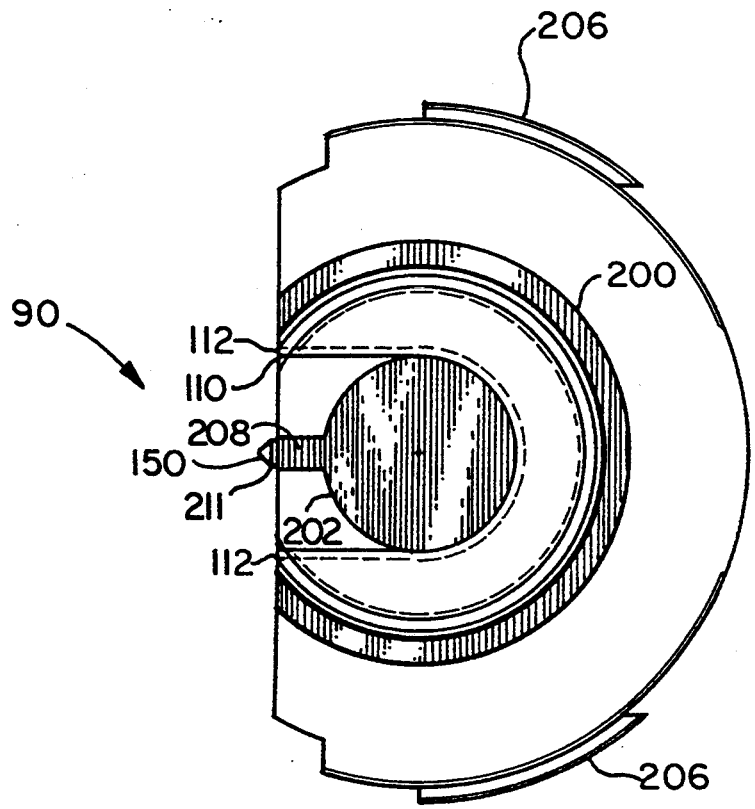
FIG. 6 is a bottom view of the interconnection module taken along line 6—6 of FIG. 3.

Returning to FIG. 3, it is seen that the battery assembly 100 is constrained from axial translation within the barrel 26 by the contact springs 108 and 106 which are respectively attached to the interconnection module 30 within contact spring recess or retainer 110 and upon respective contact spring retainer 112 as previously mentioned. The interconnection module 90 is preferably made of a platable engineering resin, such as RYTON. The interconnection module 90 preferably provides a unitary three-dimensional circuit board for connecting the battery assembly with the lamp 81 and with the charging contacts 34 and 36. Conductors are preferably selectively plated upon the surface of interconnection module 90 and through openings therein. As shown in FIG. 6, electrical contact from the battery assembly 100 to the interconnection module 90 is made by the contact springs 108 and 106 to respective spring contact pads 200 and 202 which are plated upon the bottom of the interconnection module 90. The central contact pad 202 has a retainer 110 thereon for for contacting the spring 108 and hence battery terminal 104. Tabs 206 extend outward from the periphery of the interconnection module 90 in order to secure the module 90 into grooves (not shown) cut into the interior surface of the head 28.

Figure 7:
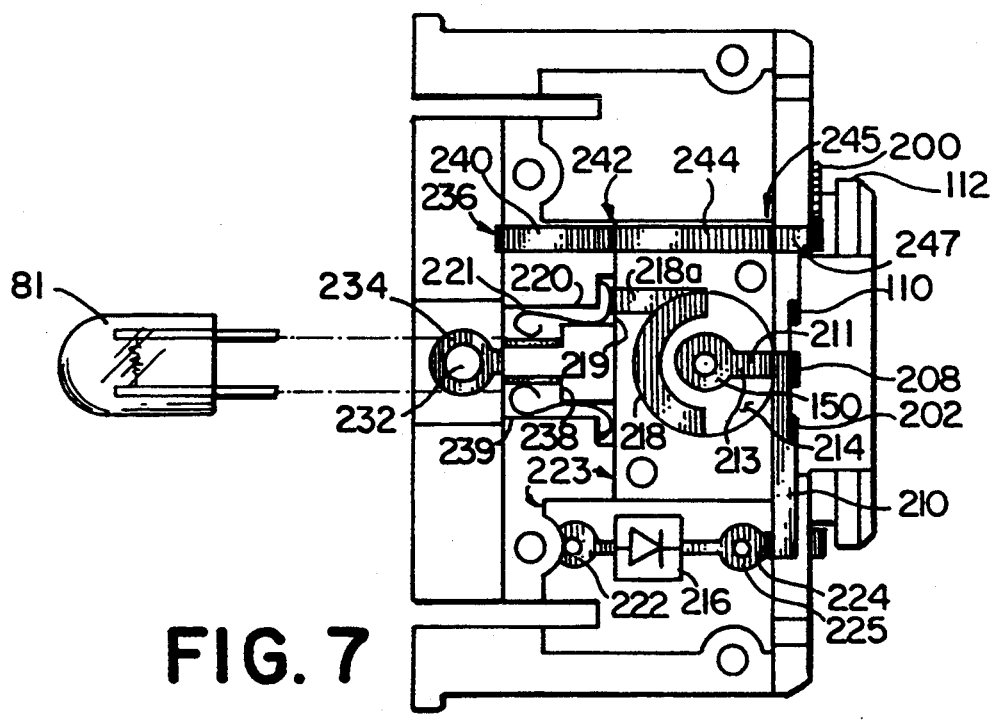
FIG. 7 is an elevational view of the interconnection module taken along line 7—7 of FIG. 3.
Figure 8:
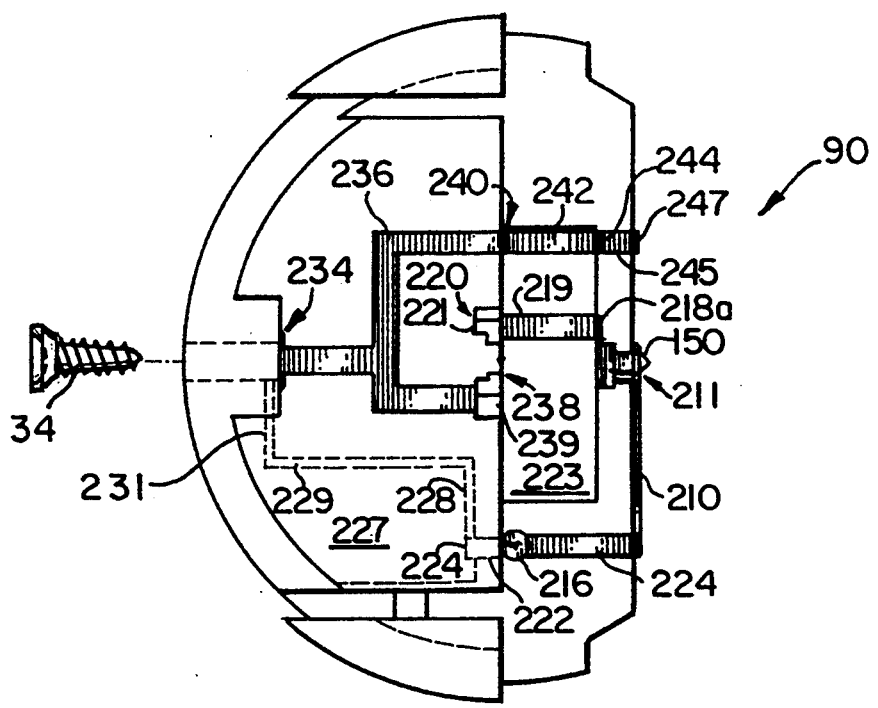
FIG. 8 is a plan view of the interconnection module taken along line 8—8 of FIG. 3.

The contact pad 202 is connected to trace 208 which extends to the leftward edge of the bottom of the module 90. Turning to FIG. 7, it may be seen that conductor 210 contacts trace 208 at the leftward edge of the bottom of the module 90. The trace 210 connects, at one end, to trace 211 and, at the other end, to trace 224. Trace 211 connects to trace 213 which leads into the switch well 214 and then connects to plunger shaft 150. When the switch contact plunger 88 is depressed into the switch well 214, electrical connection is made from trace 213 to trace 218 through post 150, spring 157, and plunger 88. Trace 218 is raised above the floor of switch well 214, and consequently is raised above trace 213 and extends partially around the periphery of the switch well 214 and connects to trace 218a. As best seen in FIG. 8, trace 218a connects to trace 219 which extends toward the base of spring housing 220. Returning to FIG. 7, it is shown that the interior of spring housing 220 contains a spring clip 221. The interior of spring housing 220 is metal plated to provide a socket for one prong of the bi-pin lamp which is secured into position by spring clip 221. Thus it may be seen that one side of the lamp circuit is completed from contact pad 202 via trace 208; to traces 210, 211, and 213; to post 150 and spring 157 to contact plunger 88 and across the switch well 214 to traces 218 and 218a; and then to the spring housing 220 via trace 219. In the preferred embodiment, the branch of the lamp circuit just described is the branch of positive polarity.

Figure 9:
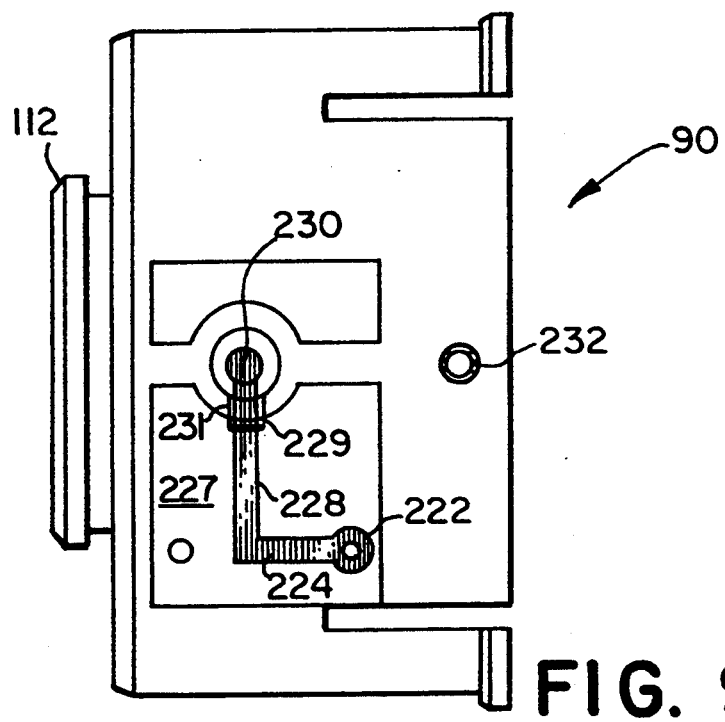
FIG. 9 is an elevational view of the interconnection module taken along line 9—9 of FIG. 3.

The trace 210 also provides connection to trace 224 which extends to a plated hole or opening 225 in which one lead of a blocking diode 216 is soldered. The blocking diode 216 prevents the battery voltage from being present at the charging terminals when the flashlight is not being charged. The blocking diode 216 extends from plated hole or opening 225 to plated hole or opening 222. Plated hole 222 extends through the module 90 into a recess 227 as seen best in FIG. 9. Within recess 227, contact is made from plated hole 222 to trace 224. Trace 224, in turn, leads to trace 228. Trace 228 is connected to trace 229 which extends outward from the bottom of the recess 227. Trace 229 connects to trace 231 which leads to plated hole or opening 230. Plated hole 230 is the hole or opening which receives the screw that forms charging contact 36. The other charging contact 34, which is preferably the negative contact, is screwed into plated hole 232. Turning to FIG. 7, it is seen that the interior side of plated hole 232 is surrounded by trace 234. Trace 234, as seen in FIG. 8, contacts forked trace 236. One fork of forked trace 236 completes one side of the negative circuit to recess 238 in which is contained spring clip 239. Plated spring recess 238 forms the negative socket for one of the pins of the bi-pin lamp. The other fork of forked trace 236 extends toward the shelf 223 of the module 90. Referring again to FIG. 7, it can be seen that forked trace 236 connects to trace 240 which extends to the top surface of the shelf 223. At the surface of the shelf, trace 240 joins with trace 242, as shown in FIG. 8, and extends across the shelf 223. At the edge of the module 90, trace 242 joins with trace 244. Turning again to FIG. 7, trace 244 extends toward the rear surface of the module 90 and connects to trace 245. Trace 245 extends to the edge of the module 90 and connects with trace 247. Finally, trace 247 connects to the contact pad 200, thus completing the negative branch of the lamp circuit.

Figure 10:
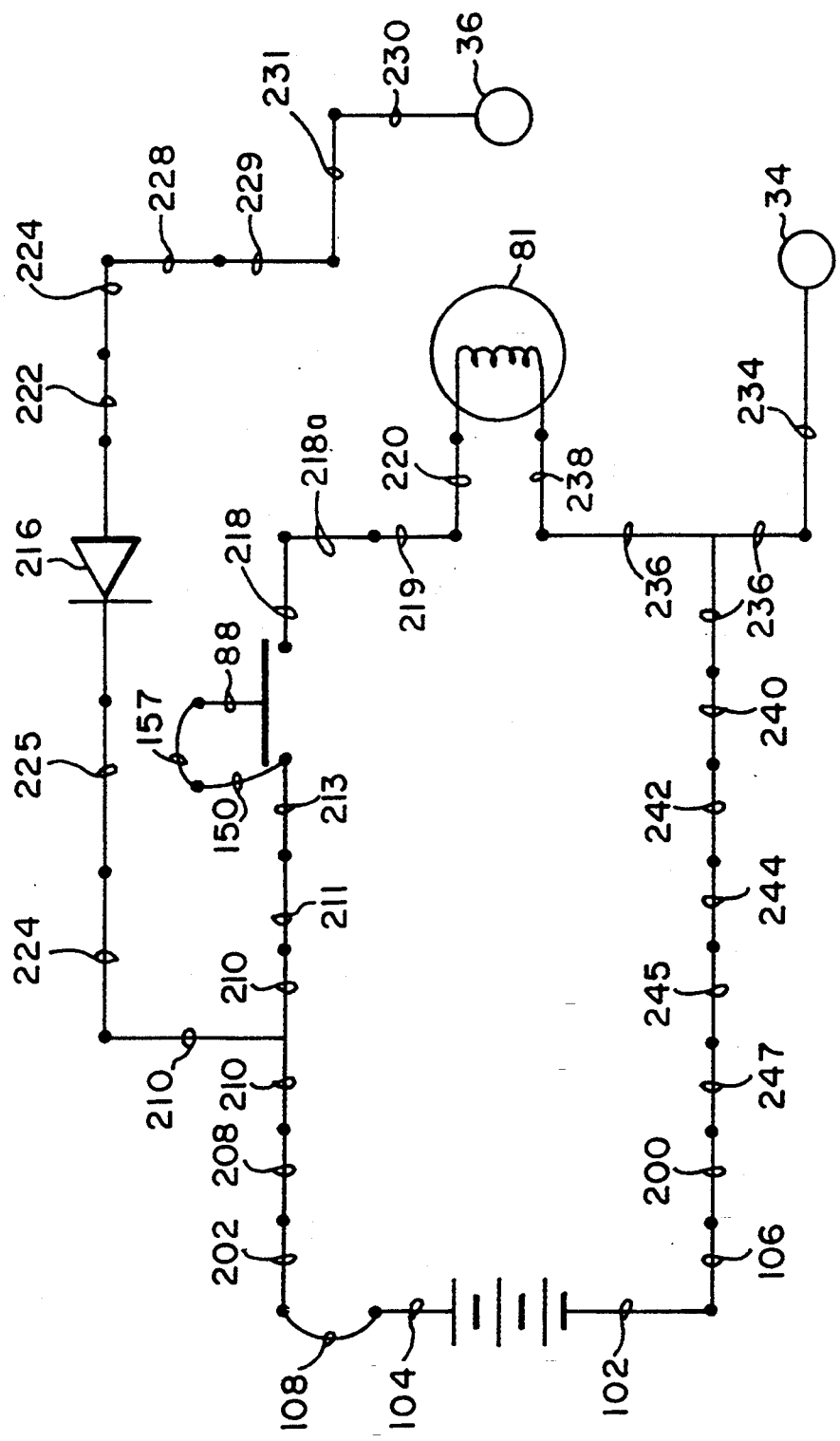
FIG. 10 is a schematic circuit diagram illustrating the electrical connections of physical components of the flashlight shown in FIGS. 1, 3, and 6–10.

To further clarify the configuration of the lamp and charging circuit, the diagram of FIG. 10 illustrates the schematic arrangement of the traces described in connection with the preceding figures. Each trace of the circuit shown in FIG. 10 is drawn as an individual conductive element with the appropriate trace indicated thereon. Indeed, the module 90 may be alternatively constructed using interconnected conductive elements or segments, rather than plated traces to complete the circuit.

From the foregoing disclosure and the accompanying drawings, it can be seen that the present invention provides certain novel and useful features that will be apparent to those skilled in the pertinent art. In particular, there has been described a compact rechargeable flashlight employing a unitary molded electrical interconnection module; a battery assembly which simplifies the fabrication of the flashlight; and a charging unit which provides ease of insertion and removal of a compact flashlight. It should also be apparent that the flashlight oriented in the charger unit by the guide plate and alignment recess, orients the switch of the flashlight in the same, accessible position when charging the flashlight. Accordingly, if the flashlight is grasped in a dark environment, the person removing the flashlight from the charger unit can easily know where the switch is located and find it for ready use upon removing the flashlight from the charger unit, as used by police officers in their vehicles in emergencies.

The terms and expressions which have been employed are used as terms of description and not of limitation and there is no intention in the use of such terms and expressions of excluding any equivalents of the features shown and described, or portions thereof, but it is recognized that various modifications are possible within the scope of the invention claimed.

That which is claimed is:

1. A flashlight comprising:
    a barrel having a forward end and a rear end adapted to receive at least one battery;
    a head assembly connected to the forward end of the barrel, said head assembly having an enlarged portion relative to the barrel;
    a light source within said head assembly;
    first and second charging contacts on the enlarged portion of said head assembly adapted to contact respective terminals on a charging receptacle; and
    connecting means in the head assembly for providing an electrical connection between the charging contacts and said battery and for providing an electrical connection between said battery and said light source, the connecting means comprising an insulating module having conductive members selectively plated on surfaces of said insulating module.

2. The flashlight of claim 1 wherein said connecting means comprises a spring and said insulating module comprises spring retaining means for retaining said spring.

3. A flashlight comprising:
    a barrel having a forward end and a rear end adapted to receive at least one battery;
    a head assembly connected to the forward end of the barrel, said head assembly having an enlarged portion relative to the barrel;
    a light source within said head assembly;
    first and second charging contacts on the enlarged portion of said head assembly adapted to contact respective terminals on a charging receptacle; and
    connecting means in the head assembly for providing an electrical connection between the charging contacts and said battery and for providing an electrical connection between said battery and said light source, the connecting means including a switch for operating the flashlight, positioned on the enlarged portion of the head assembly.

4. The flashlight of claim 3 in which at least one of the charging contacts is located substantially on an opposite quadrant of the enlarged portion of the head assembly from the switch.

5. A charging unit for charging a rechargeable flashlight that has a head portion with a light source therein and a charging contact on the head portion, the charging unit comprising:
    head holding means, for releasably holding the head portion of the flashlight having the light source therein, the head holding means including gripping means for gripping the head portion of the flashlight and said gripping means includes a pair of pivotally mounted jaws for releasably holding the head portion of the flashlight;
    terminal means supplying electrical energy to the charging contact on the head portion of the flashlight, the terminal means being located along the head holding means for mating with the charging contact; and
    alignment means located along the head holding means for guiding the head portion of the flashlight into a desired peripheral alignment to have the charging contact on the head portion mate in radial alignment with the terminal means of the charging unit.

6. A flashlight comprising:
    a barrel having a forward end and a rear end adapted to receive at least one battery;
    a head assembly connected to the forward end of the barrel;
    a light source within said head assembly;
    a guiding member extending radially from said head assembly for guiding said head assembly into radial alignment with a charging receptacle;
    at least one charging contact on said head assembly; and
    connecting means in the head assembly for providing an electrical connection between said charging contact and said battery and for providing an electrical connection between the battery and the light source, said connecting means comprising an interconnection module in said head assembly having spring retaining means, and spring means having a pair of concentric springs extending rearwardly from said spring retaining means for electrical connection with said battery.

7. A charging unit for charging a rechargeable flashlight that has an enlarged head portion with a light source therein and a pair of charging contacts on the enlarged head portion, the charging unit comprising:
    head holding means for releasably holding the enlarged head portion of the flashlight; and
    a pair of charging terminals for supplying electrical energy to the charging contacts on the enlarged head portion of the flashlight, the charging terminals being located along the head holding means in alignment with the charging contacts.

8. The charging unit of claim 7 in which the unit further includes an alignment means to orient the enlarged head portion of the flashlight in a desired orientation for having the charging terminals contact the charging contacts of the flashlight.

9. The charging unit of claim 8 in which the charging terminals are point contacts adapted to mate with point charging contacts on the enlarged head.

* * * * *